(12) United States Patent
Holt et al.

(10) Patent No.: US 7,308,827 B2
(45) Date of Patent: Dec. 18, 2007

(54) INTEGRATED GYROSCOPE AND TEMPERATURE SENSOR

(75) Inventors: Sherrie Burgett Holt, Grant, AL (US); Michael S. Kranz, Madison, AL (US)

(73) Assignee: United States of America as represented by the Secretary of the Army, Washington, DC (US)

(*) Notice: Subject to any disclaimer, the term of this patent is extended or adjusted under 35 U.S.C. 154(b) by 130 days.

(21) Appl. No.: 11/070,509

(22) Filed: Mar. 2, 2005

(65) Prior Publication Data

US 2006/0196266 A1    Sep. 7, 2006

(51) Int. Cl.
    *G01C 19/00*    (2006.01)
(52) U.S. Cl. .................. 73/504.02; 73/504.12
(58) Field of Classification Search ............ 73/504.02, 73/504.11, 504.12, 503.3, 504.03, 504.04, 73/504.08, 504.13, 504.14, 504.15, 504.18
    See application file for complete search history.

(56) References Cited

U.S. PATENT DOCUMENTS

| | | | | |
|---|---|---|---|---|
| 5,313,835 A | * | 5/1994 | Dunn ...................... | 73/514.15 |
| 6,067,858 A | | 5/2000 | Clark et al. ............... | 73/504.16 |
| 6,539,801 B1 | | 4/2003 | Gutierrez et al. ......... | 73/504.12 |
| 6,928,873 B2 | * | 8/2005 | Chen et al. ............... | 73/504.04 |
| 6,959,583 B2 | * | 11/2005 | Platt .......................... | 73/1.37 |
| 2005/0092086 A1 | * | 5/2005 | Chen et al. ............... | 73/514.32 |

OTHER PUBLICATIONS

M. Kranz et al., "A Single Layer Silicon-On-Insulator MEMS Gyroscope for Wide Dynamic Range and Harsh Environment Applications," SPIE, 4559, pp. 5-16, Oct. 2001.
M. Kranz, S. Burgett et al., "A Wide Dynamic Range Silicon-On-Insulator MEMS Gyroscope with Digital Force Feedback", Proc. of Transducers '03, Jun. 2003, 1D4.1.

* cited by examiner

*Primary Examiner*—Hezron Williams
*Assistant Examiner*—Tamiko Bellamy
(74) *Attorney, Agent, or Firm*—Michael K. Gray (57) ABSTRACT

A gyroscope and temperature sensor are formed on a single chip using SOI-MEMS technology. The temperature sensor has an array of resistors to accurately detect the temperature of the gyroscope in temperatures and conditions that can range from extreme heat to extreme cold. The positioning of the gyroscope and temperature sensor on the same chip allow for extremely accurate real-time feedback of the gyroscope's temperature for utilization by a control system.

17 Claims, 8 Drawing Sheets

INTEGRATED GYROSCOPE AND TEMPERATURE SENSOR

The invention described herein may be manufactured, used and licensed by or for the U.S. Government for governmental purposes without payment of any royalties thereon.

BACKGROUND OF THE INVENTION

I. Field of the invention

The present invention relates to gyroscopes.

More particularly, the present invention incorporates a stationary three-fold symmetric vibratory rate gyroscope implementation and integrated temperature sensors in a thick-film silicon-on-insulator (SOI), micro electromechanical system (MEMS).

II. Discussion of the Background

Small, affordable, and reliable inertial components are required for small diameter precision-guided military weapon systems. Gyroscopes are inertial components or devices that can sense angular rotation and/or rotation rate. The ring laser and interferometric fiber optic gyroscopes dominate the current tactical missile system market. Although these gyroscope technologies meet most inertial requirements, they tend to be moderately expensive. Recent advancements in microelectromechanical systems (MEMS) technologies make it possible to develop miniaturized, low cost angular rate sensors. The process technologies initially developed for fabricating integrated circuits have now evolved to allow development of MEMS devices.

Although many organizations are developing MEMS gyroscopes for a variety of applications, most do not begin to address the demanding and challenging requirements for military combat systems. Requirements for small precision guided weapons were the basis for the MEMS gyroscope development criteria. Rate sensing in many small diameter missile guidance units typically requires a rate resolution of 10°/hr. Additionally, for a particular guided munition, a large roll rate about its longitudinal axis may be experienced during flight. The anticipated rotational rates encompass a range of −3000° to +3000°/sec, resulting in a dynamic range of $10^7$.

In order to control the heading of this system during flight, the system must know its roll angle about the longitudinal axis so that the control systems can adjust accordingly. Therefore, the accuracy of this angular measurement must correspond to a bias stability of 10°/hr in order for the guidance system to compensate.

Furthermore, actuators in the control system of the guided munition may result in a substantial vibration environment. Large shocks of greater than 1000 G's can be seen at frequencies ranging from 5 kHz to 15 kHz. Additionally, the inertial device must operate through military temperature environments (−55° to +125°). The criteria for achieving superior resolution while measuring large rotation rates adds difficulty to design determination since there are tradeoffs that exist in determining the mechanical structure's topology.

For example, achieving superior resolution requires substantial inertial mass available in the device. However, when a large mass design is devised, the resulting deflections due to large values of rotational rate are generally more than the device can accommodate. In most cases, enough electrostatic feedback force cannot be produced to counter the Coriolis forces. Given that the MEMS gyroscope must not only survive but operate through these harsh environments, the challenge has been to develop a robust, accurate and reliable MEMS gyroscope.

MEMS angular rate sensors or gyroscopes that detect angular rate utilize the Coriolis Effect. A vibratory rate gyroscope is a sensor that detects and measures rotation by generating and measuring Coriolis acceleration. In other words, the sensing method used in a vibratory rate gyroscope is based on the Coriolis pseudo-force resulting from a translating body in a rotating frame of reference. The conventional illustrations of FIG. 1 and FIG. 2 demonstrate the Coriolis Effect on an object.

Figure 1:
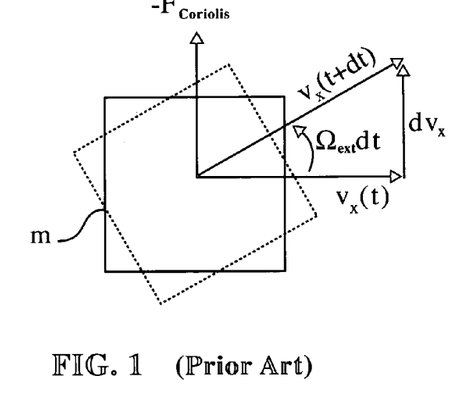
FIG. 1 and FIG. 2 are prior art graphical illustrations of a mass experiencing a corriolis force.
Figure 2:
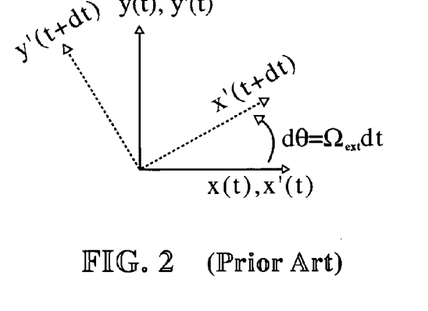

A mass, m, is moving at time, t, with a velocity $v_x$ along both the (x, y) and (x',y') axes.

At time t+dt, the (x', y') axes have rotated $\Omega dt$ where $\Omega$ is the rotational rate. In accordance with Newton's Laws, the mass is still moving with velocity $v_x$ in the (x,y) frame of reference.

However, in the (x',y') frame of reference, it appears that the velocity, $v_x$ has moved by an amount $dv_x$. Therefore the Coriolis acceleration and force is:

$$a = \frac{dv}{dt} = -2\Omega v_x \qquad \text{Equation (1)}$$

$$F = ma = -2m\Omega v_x \qquad \text{Equation (2)}$$

The fundamental result from this simple derivation of system dynamics is that a translating mass in a rotational frame of reference will appear to experience, within the rotating frame, a force orthogonal to its velocity and proportional to its velocity and the rate of rotation of that frame of reference.

Figure 3:
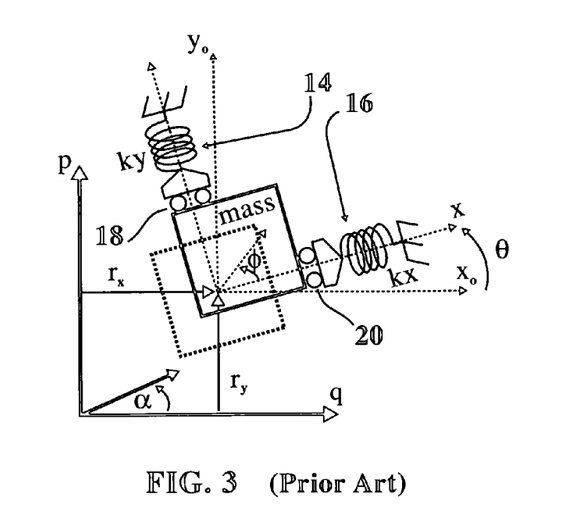
FIG. 3 is a prior art graphical illustration of a mass-spring system having two orthogonal modes of oscillation.

The conventional vibratory rate gyroscope consists of a mass-spring system that has at least two orthogonal modes of oscillation (FIG. 3). The mass is forced to have an oscillatory velocity in the frame of reference of the device along the x-axis. Anchored springs 16 and 14 having respective identical spring constants $k_x$ and $k_y$ are attached to respective rollers 20 and 18 so as to provide a suspension that constrains the mass to particular orthogonal oscillation modes. When the device experiences rotation, the Coriolis force induces oscillation of the orthogonal mode of the device. Sensors detect this motion and provide a signal from which the rotational rate is extracted. The Coriolis force is proportional to the external rotation rate.

The equations of motion for a mass-spring system moving in a non-inertial reference frame are found using Lagrangian dynamics. Expressions for the potential energy and kinetic energy of the system must be derived first.

The global frame of reference is the p-q-α frame, the local frame of reference x-y-φ is rotated by an angle θ with respect to the global frame. The local frame is also translated by $r_x$ and $r_y$ with respect to the global frame.

The potential energy stored in the springs is:

$$PE = \frac{1}{2}k_x x^2 + \frac{1}{2}k_y y^2 + \frac{1}{2}k_\phi \phi^2 \qquad \text{Equation (3)}$$

The kinetic energy is calculated in the global frame of reference, using the global variables:

$$KE = \frac{1}{2}m\left(\frac{dq}{dt}\right)^2 = \frac{1}{2}m\left(\frac{dp}{dt}\right)^2 + \frac{1}{2}I\left(\frac{d\alpha}{dt}\right)^2 \qquad \text{Equation (4)}$$

The global variables are related to variables in the local frame of reference by rotation matrices:

$$q(t)=\cos(\theta)x(t)-\sin(\theta)y(t)+r_x(t) \qquad \text{Equation (5)}$$

$$p(t)=\sin(\theta)x(t)+\cos(\theta)y(t)+r_y(t) \qquad \text{Equation (6)}$$

$$\alpha(t)=\theta(t)+\phi(t) \qquad \text{Equation (7)}$$

The equations of motion in the local frame of reference are found from $$F_{x_i} = \frac{\partial L}{\partial x_i} - \frac{d}{dt}\frac{\partial L}{\partial \dot x_i} \qquad \text{Equation (8)}$$

Where $x_i$ are generalized coordinates, $F_x$, are external forces such as damping and excitation forces, and L is the Lagrangian (L=KE−PE).

The global coordinates in the kinetic energy relation are substituted by Equations (5), (6) and (7) to convert to local coordinates. Equation (8) is then applied for each of the on-chip coordinates (x, y, φ), by replacing the generalized coordinate by the respective on-chip coordinate, yielding:

$$\ddot x = -\omega_x^2 x - \frac{\omega_x}{Q}\dot x - \frac{F_x}{m} + x\Omega^2 + \qquad \text{Equation (9)}$$
$$y\dot\Omega + 2\Omega\dot y - a_x\cos\theta - a_y\sin\theta$$

$$\ddot y = -\omega_y^2 y - \frac{\omega_y}{Q}\dot y - 2\Omega\dot x + y\Omega^2 - x\dot\Omega + \qquad \text{Equation (10)}$$
$$a_x\sin\theta - a_y\cos\theta$$

$$I\ddot\phi = -k_\phi\dot\phi - I\phi \qquad \text{Equation (11)}$$

Where $\omega_x^2=k_x/m$ and $\omega_y^2=k_y/m$ are the resonant frequencies of the x and y modes, respectively, $a_x$ and $a_y$ are external accelerations, and Q is the quality factor of resonance. The Coriolis accelerations are the $2\Omega\dot y$ and $2\Omega\dot x$ terms. The last two terms in Equations (9) and (10) are the acceleration terms, which create transients at the natural frequency of the system. The terms $y\dot\Omega$ and $x\dot\Omega$ refer to the inertia of angular acceleration. The terms $y\Omega^2$ and $x\Omega^2$ are centripetal accelerations, and act as spring softeners.

The importance of the above derivation is that it includes extra terms in the equations of motion beyond the standard Coriolis force terms. When experiencing large rotational rates and angular accelerations, these extra terms, the centripetal acceleration, linear acceleration and angular accelerations, play larger roles in the error terms of the rotational rate signal.

In addition, the derivation shows, as is commonly known, the role of matching resonant frequencies so that the benefits of a high quality factor can be applied to the sensor.

The coefficients in the above equations, particularly the spring constant and quality factor, are dependent on temperature. In prior art systems, the temperature sensors are prone to sense temperatures at variance from the actual temperature of the gyroscope. Such a result causes errors in the rotational calculations.

In micro-electronic designs, the proof mass of the gyroscope is positioned and moves above a base substrate surface. Even when experiencing high G forces, the proof mass must remain above the substrate surface.

SUMMARY OF THE INVENTION

Accordingly, one object of the invention is to provide a gyroscope having a temperature sensor that accurately conveys the actual temperature experienced by the gyroscope.

Another object of the invention is to provide a gyroscope that has a proof mass support structure that prevents the proof mass from touching the base substrate even when subjected to high G forces so as to prevent failure of the device.

Still another object of the present invention is to provide a SOI-MEMS gyroscope having a superior dynamic range capability.

Yet another object is to provide a SOI-MEMS gyroscope that is economical to manufacture.

These objects are provided by a SOI-MEMS gyroscope having a proof mass that is suspended over a base substrate surface by a three-fold suspension that prevents the proof mass from touching the base substrate surface even when exposed to 10,000 G's of force. The symmetry is three fold in that the device is symmetric along the x and y axes and along its diagonal.

When x-axis oriented actuators are excited in one mode, rotations of the device about the z-axis result in oscillations in the orthogonal mode that are detected by y-axis oriented sensors. The mode-decoupled suspension allows only one degree of in-plane freedom for each excitation actuator, thereby attenuating errors due to oscillation axis misalignment.

In addition, suspension symmetry maintains matched oscillation mode frequencies through process and temperature variations, allowing maximized dynamic range in a wide dynamic range discrete-time control loop.

The three-fold symmetric gyroscope implementation inherently matches the resonant frequencies in both oscillation modes by using completely symmetric suspension, thereby increasing the sensitivity of the device by using the Q-factor to maximize displacements for a given force. Also, the symmetry reduces the effects of process variations on the device sensitivity. In practical implementation of the vibratory rate gyroscope, the designed Q value is constrained by the necessary bandwidth of the input rotation.

The scale factor of the device is highly dependent on the matching of the resonant frequencies, since Q is an important gain. If the frequencies are not matched, only a fraction of the Q will be seen as gain. Through time and temperature variations, changes in the modes of the SOI based MEMS vibratory rate gyroscope should match so as to prevent the scale factor from drifting.

The suspension of the present invention utilizes a folded-beam concept (the multiple strips of the present invention can be viewed as folded beams of the flexure system). Folded flexures exhibit much less nonlinearity than a single straight flexure. A one-piece straight beam when deflected orthogonal to the longitudinal axis will experience stretching along that axis. This stretching increases the actual spring constant and adds nonlinear terms.

By contrast, in the folded flexure suspension of the present invention, both the anchor holding the strips in place, and the force applied to the strips or flexure are co-linear. As the strips flex, there is no stretching thereby allowing larger linear displacements. In total, folded flexures (the multiple strips of the present invention) provide for increased linear response, reduced angular moments, and decreased cross-talk over the entire dynamic range.

Even with the three-fold symmetric gyroscope configuration, induced drifts occur as a result of the silicon material being exposed to extreme temperatures. Accordingly, these temperature drifts are remedied by accurate measurements of chip temperature that is conveyed in real time to control electronics.

The accurate measurement of chip temperature is provided by an array of resistor elements that comprise a temperature sensor that is positioned next to the gyroscope and on the same chip substrate. This allows the gyroscope and temperature sensor to be made during the same manufacturing process.

DESCRIPTION OF THE DRAWINGS

A more complete appreciation of the drawings and many of the attendant advantages thereof will be readily obtained as the same becomes better understood by reference to the following detailed description when considered in connection with the following drawings, wherein.

DETAILED DESCRIPTION

Figure 5:
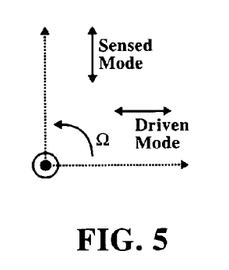
FIG. 5 is a graphic demonstrating the direction of the sensed mode and driven mode for FIGS. 4, 6, 7 and 8.

In a vibratory gyroscope, the two fundamental modes of oscillation are along the x-axis, the driven mode, and along the y-axis, the sensed mode (FIG. 5).

Figure 4:
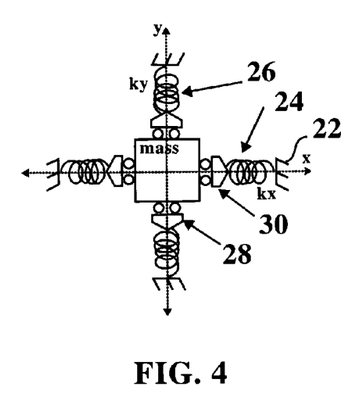
FIG. 4 is a conceptual mass-spring system of a proof mass at rest.

A conceptual suspension, shown in schematic form in FIG. 4, approximates a set of identical springs 26, 24 placed symmetrically about a central mass. The springs 26, 24 are connected to respective rolling pins 28 and 30 that allow the mass to move and slide in the y and x directions.

Figure 6:
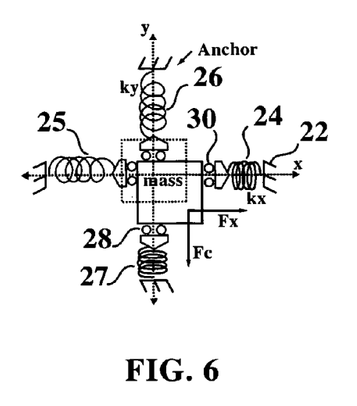
FIG. 6 is the conceptual mass-spring system of FIG. 5 in a driven mode.

In FIG. 6, the actual deflection of the mass in x and y is shown. The rolling pins 28, 30 constrain the springs to act along the x-axis or the y-axis, only. In that the mass of FIG. 6 has moved to the right and downward from its position in FIG. 4, the spring 24 is compressed against anchor 22. Spring 27 is likewise compressed from the mass' movement in the y direction while springs 26 and 25 are stretched. FIGS. 4 and 6 demonstrate that the restoring forces on the mass are always orthogonal and in line with the x- and y-axes.

In an analysis of the conceptual schematic of FIG. 6, $F_x$ represents the forcing function. If the forcing function, $F_x$, is at the resonant frequency of the driven mode, then the displacement of the proof mass is maximized, with a gain Q over the static displacement. The frequency of the Coriolis force $F_c$ is equal to the resonant frequency of the driven mode, with amplitude modulated by both maximum displacement of the mass x and the rate of external rotation.

The velocity of the excited mode, the size of the mass, and the external rotation rate determine the magnitude of the Coriolis force. If the resonant frequency of the sensed mode is equal to that of the driven mode, the maximum displacement for a given rotational rate will occur in the sensed mode.

Figure 7:
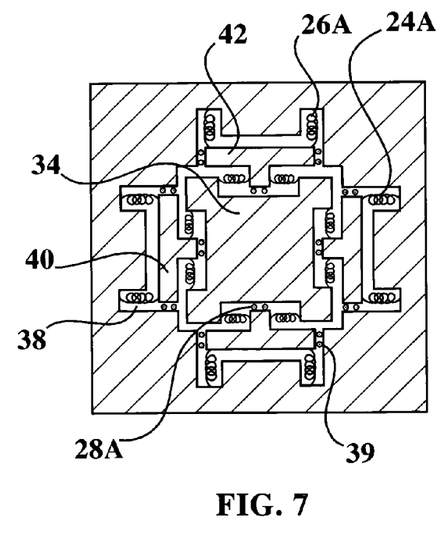
FIG. 7 is a conceptual SOI-MEMS multiple mass-spring system at rest that is analogous to FIG. 4.
Figure 8:
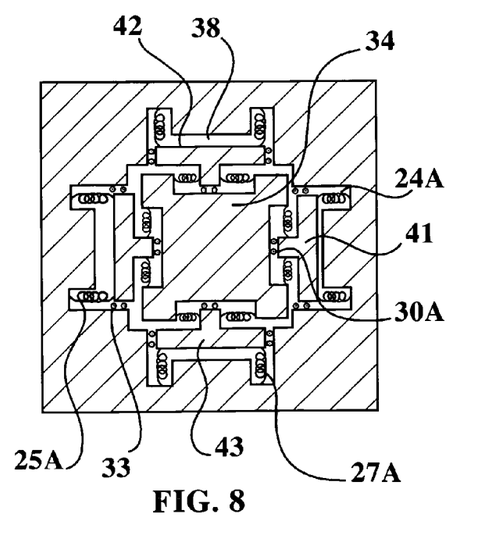
FIG. 8 is a conceptual SOI-MEMS mass-spring system in a driven mode that is analogous to FIG. 6.

In development of the present invention, the concept depicted in FIGS. 4 and 6 was taken to formulate a conceptualization of a SOI-based MEMS vibratory rate gyroscope chip (FIGS. 7 and 8).

In FIGS. 7 and 8, the central proof mass 34 is surrounded by a symmetric suspension having identical springs sets 24A, 25A, 26A, 27A, along both the x and y modes. The comb-finger actuators 40, 41 apply an electrostatic force to the proof mass in the x-direction thereby exciting the driven mode so as to allow the proof mass to move above the base substrate surface 38. The comb-finger actuators 40 and 41 are provided with rollers 33.

When experiencing an external rotation rate, the Coriolis force acts along y and has a frequency equal to that of the excitation frequency. The Q-factor of the system provides a gain in the displacement of the sensed mode. The y deflection is sensed with a pair of comb-finger capacitors 42, 43 that are connected as a differential capacitive voltage divider. The comb-finger capacitors 42, 43 are provided with rollers 33.

The spring set 26A in FIG. 7 may be thought as being analogous to the spring 26 of FIG. 4. Likewise compressed spring set 24A of FIG. 8 may be thought as being analogous to compressed spring 24 of FIG. 6. As the proof mass 34 moves from its position in FIG. 7 to the position of FIG. 8, springs are compressed and stretched in similar fashion to those of FIG. 6.

The suspension of the conceptualized MEMS vibratory rate gyroscope of FIGS. 7 and 8 is three fold symmetric. By "three fold symmetric", it is meant that there is symmetry along y, along x and along the device diagonal.

The suspension serves two purposes. First, the driven and sensed modes of the device displace different, but identical, spring sets; one set displaces in x and one set displaces in y. Spring constants as well as moving mass are matched along both the excitation and sense modes.

Therefore, both oscillation modes have equal resonant frequencies. The modes will theoretically match even if a uniform process variation occurs, e.g., over-etching of the proof mass. This matching will remain through time and temperature variations.

The second purpose of the suspension is to decouple, mechanically, the x and y deflections of the actuators and sensors. The suspension allows motion of the central mass in both x and y using complete springs that are very stiff in one direction and very compliant in the other. The masses that attach to the actuators and sensors are placed in the suspension in such a way that they can only move along one axis. Thus, a deflection of the proof mass 34 in x will not affect the comb-sensor 42 which only moves in y. Therefore, the spring network reduces the mechanical cross-talk between the sensors and actuators.

The suspension is made up of simple folded beam springs. In both the x and y directions, there is a total of 6 springs per direction, resulting in a total spring constant for each mode of:

$$k_x = \frac{6Ehw_x^3}{l_x^3} \quad k_y = \frac{6Ehw_y^3}{l_y^3},$$

where h is the thickness of the beam, $w_x$ and $w_x$, are widths of the beams along x and the beams along y, respectively, and $l_x$ and $l_y$ are the lengths of the beams along x and beams along y, respectively.

The comb-drive actuators in the device can produce a force, $F_d$, and a displacement in the excited mode, $x_e$, of:

$$F_d = \frac{1.14N\varepsilon_o hV^2}{g_o}$$

$$|x_e| = \frac{QF_d}{k_x},$$

where $g_o$ is the gap between fingers of the comb-drive, N is the number of fingers, h is the thickness of the fingers, and V is the voltage across the actuator. The factor of 1.14 accounts for nonideality of the actuator due to fringing fields.

The resonant frequency of the sensed mode (and hence the driven mode) is:

$$\omega_{ry} = \sqrt{\frac{k_y}{m}} = \omega_{rx}$$

One can predict the magnitude of the sensed displacement, y, given the mass, m, the modes resonant frequency, $\omega_{ry}$, the external rotation rate, $\Omega$, the Q-factor of resonance, and the spring constants. That mechanical sensitivity is then $$\left|\frac{y}{\Omega}\right| = \frac{2mQ^2\omega_r F_d}{k_x k_y}$$

Brownian noise will place a limit on the resolution of the device. This noise can be estimated with the following equation [14]

$$\overline{F_n^2} = \frac{4kT\omega_r \Delta f}{Q},$$

which will represent a noise in the rotational rate signal of [3]

$$\Omega_n = \sqrt{\frac{kT\Delta f}{mQ\omega_r x^2}}$$

These equations can be used to size the gyro geometries for specific rate ranges, sensitivity, and resolution requirements.

Much experimentation was required to progress from the conceptual (SOI-based) MEMS vibratory rate gyroscope of FIGS. 7 and 8 to the operable device of the present invention.

Figure 9:
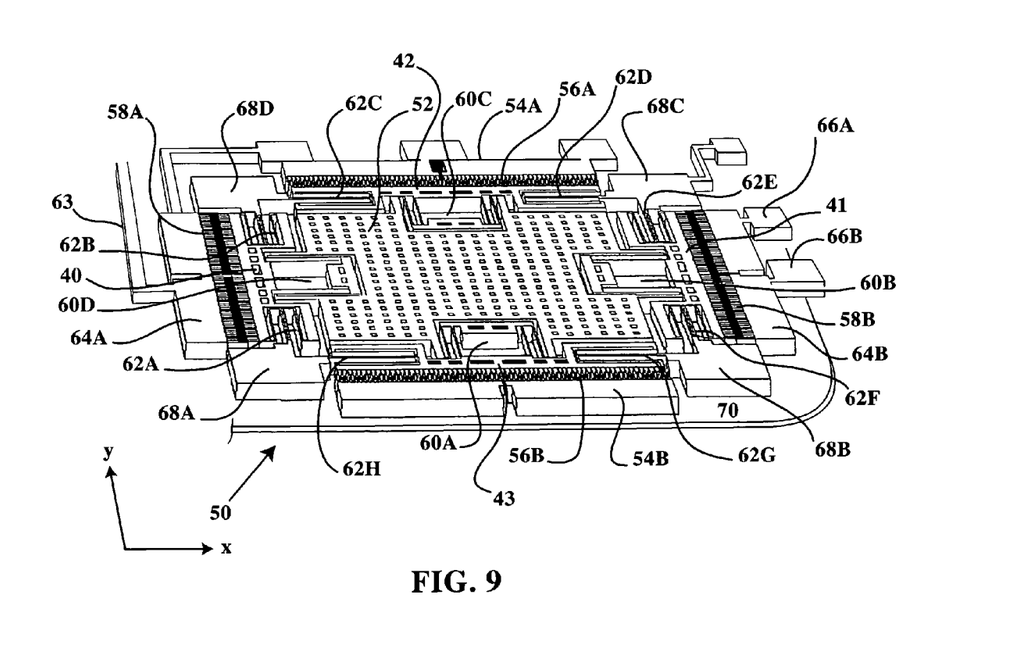
FIG. 9 is a perspective illustration of a SOI-MEMS gyroscope according to the present invention.

With reference to FIG. 9, the silicon-on-insulator-based (SOI-based) MEMS vibratory rate gyroscope 50 of the present invention is a single layer structure having a proof mass 52 that is placed in a three-fold decoupled symmetric suspension with matched fundamental oscillation modes. The suspension includes four central flexures 60A, 60B, 60C and 60D and eight lateral flexures 62A, 62B, 62C, 62D, 62E, 62F, 62G, 62H.

Lateral flexures 62A and 62H are anchored by lateral anchor 68A. Lateral flexures 62F and 62G are anchored by lateral anchor 68B. Lateral flexures 62E and 62D are anchored by lateral anchor 68C and lateral flexures 62C and 62B are anchored by lateral anchor 68D. Anchor (stator) 54B is connected to sensor 56B, and anchor (stator) 54A is connected to sensor 56A. Sensors 56A and 56B are comb-finger capacitors. Anchor (stator) 64A is connected to comb-finger actuator 58A and anchor (stator) 64B is connected to comb-finger actuator 58B. Electrical connections such as connector 63 connect the comb-finger actuators to bond sites such as bond sites 66A, 66B. A transimpedance amplifier (not shown) can be utilized to detect the currents in the capacitive divider of the sensed comb-finger capacitors and the currents in the drive off-chip electronics. The detected data is provided to a CPU or control part of the missile control system.

Figure 11:
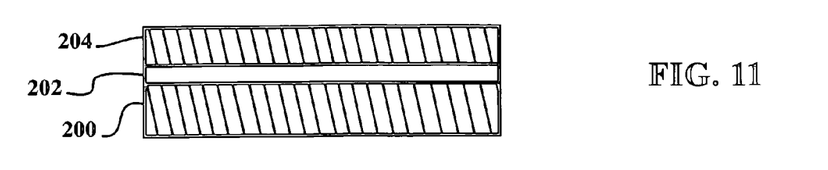
FIG. 11 is a side-view of a top silicon substrate on an oxide SOI wafer of micron thickness as used in manufacturing the present invention.

The device is fabricated in a cost effective and highly controllable process for in-plane inertial sensors. In FIG. 11, the process begins with a silicon-on-insulator wafer having a 100 μm thick silicon layer 204 on top of a 2 μm or 1 μm thick oxide layer 202. A silicon base layer or standard silicon handle wafer 200 lies below the oxide layer.

Figure 12:
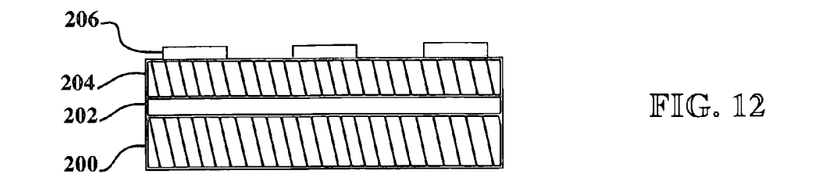
FIG. 12 is a side-view showing that the top silicon substrate layer of FIG. 11 is applied and patterned by photoresist.
Figure 13:
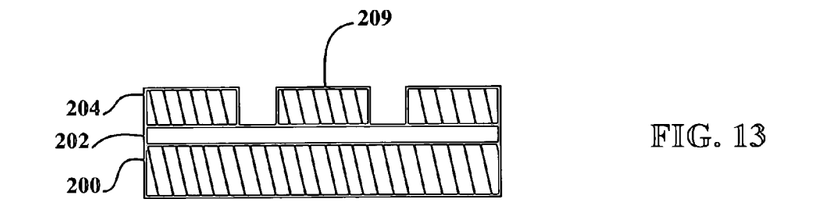
FIG. 13 is a side-view showing how the top silicon substrate layer of FIG. 12 is subjected to a Si reactive ion etch and strip photoresist.

Then, in FIG. 12 a thick photoresist mask 206 is patterned on the wafer using standard lithography. Thereafter, in FIG. 13, deep Silicon Reactive Ion Etching (Si RIE) is used to define the microstructure by etching away the oxide layer 202.

Figure 14:
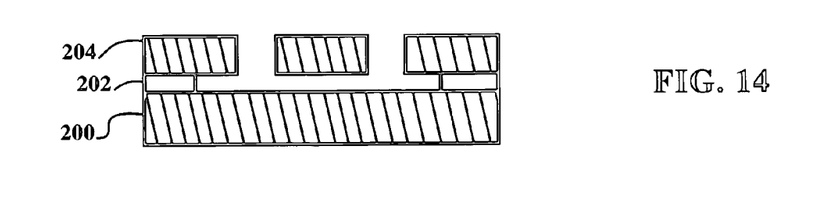
FIG. 14 is a side view showing that the top silicon substrate layer of FIG. 13 is subjected to an isotropic oxide etch to release microstructure.

After the deep etch and removal of photoresist, the device undergoes a sublimation-based release process (FIG. 14) so as to release given structures 209.

Figure 15:
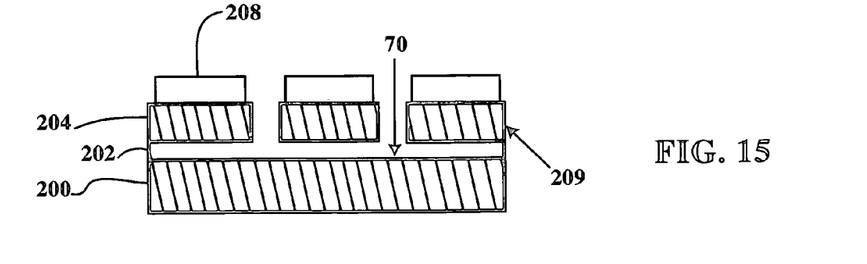
FIG. 15 is a side-view showing that top silicon substrate layer of FIG. 14 is selectively provided with a metal layer to provide for electrical contacts.

After release, metallization is evaporated on the surface to create electrical contacts 208 of gold, silver or other appropriate metal (FIG. 15). The mechanical structure is integrated in a vacuum-sealed hermetic package with a separate CMOS readout ASIC.

Figure 16:
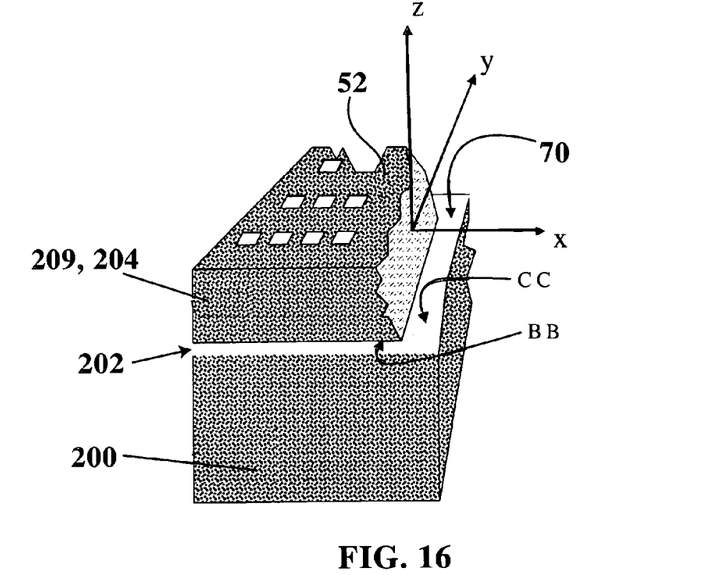
FIG. 16 is a sectional perspective view of the SOI-MEMS gyroscope of the present invention in which a gap 70 of micron thickness exists between the surface BB of the top silicon substrate layer and the surface CC of a bottom layer of silicon.

In FIG. 16, a sectional view is present to demonstrate that the proof mass 52 is suspended above the base substrate surface 70 such that the distance from the bottom surface BB of proof mass 52 to the top surface CC of the base substrate 200 is 1 or 2 μm.

Figure 17:
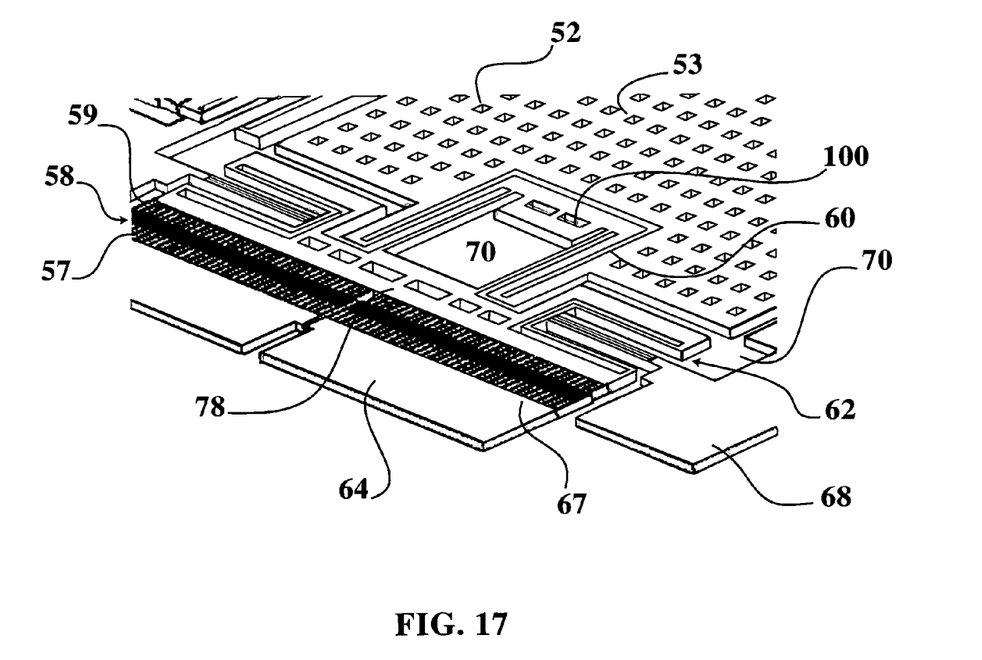
FIG. 17 is a perspective view of the gyroscope according to the present invention which demonstrates the central and lateral flexures that support the proof mass above the base substrate.

With reference to FIG. 9 and FIG. 17, the proof mass 52 is provided with holes 53 which are utilized during the fabrication process to allow chemicals to pass through to the base substrate surface 70. A lateral anchor 68 connects to a lateral flexure 62. The central flexure 60 has a strip connector or truss 100 integrally connected to four strips of the central flexure that are attached to the central part 80 of flexure support (rotor) 78. Flexure support (rotor) 78 connects to a row of fingers 59 of the comb-finger actuator 58. The fingers are cantilevered to the flexure support 78. A second row of fingers 57 is cantilevered to the anchor (stator) 64 at a front edge 67 of the anchor. In such a manner the comb-fingered actuators 58A, 58B and comb-fingered sensors 56A, 56B are positioned around the periphery of proof mass 52.

Figure 18:
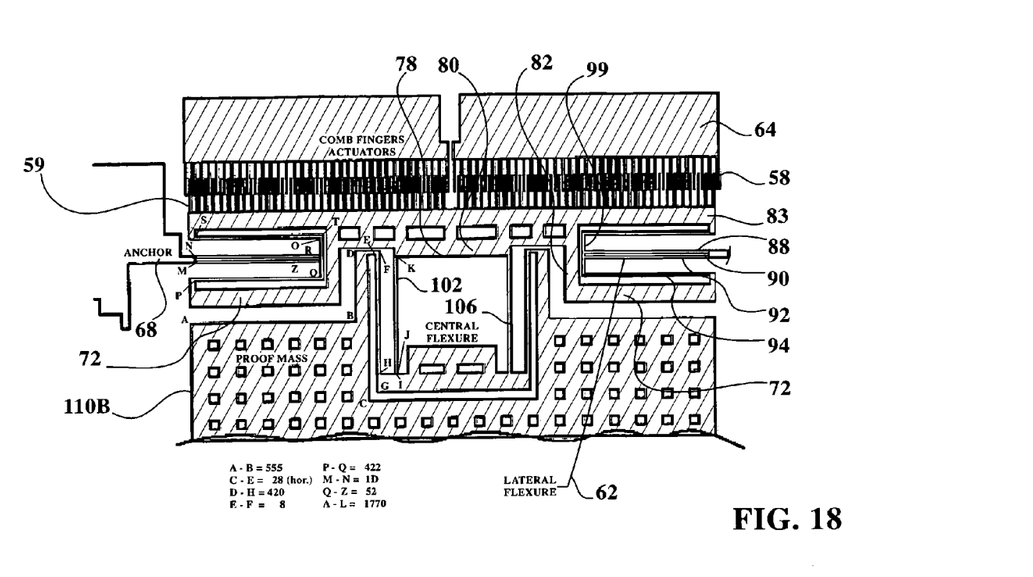
FIGS. 18 and 19 are top view of the proof mass and central and lateral flexures according to the present invention.
Figure 19:
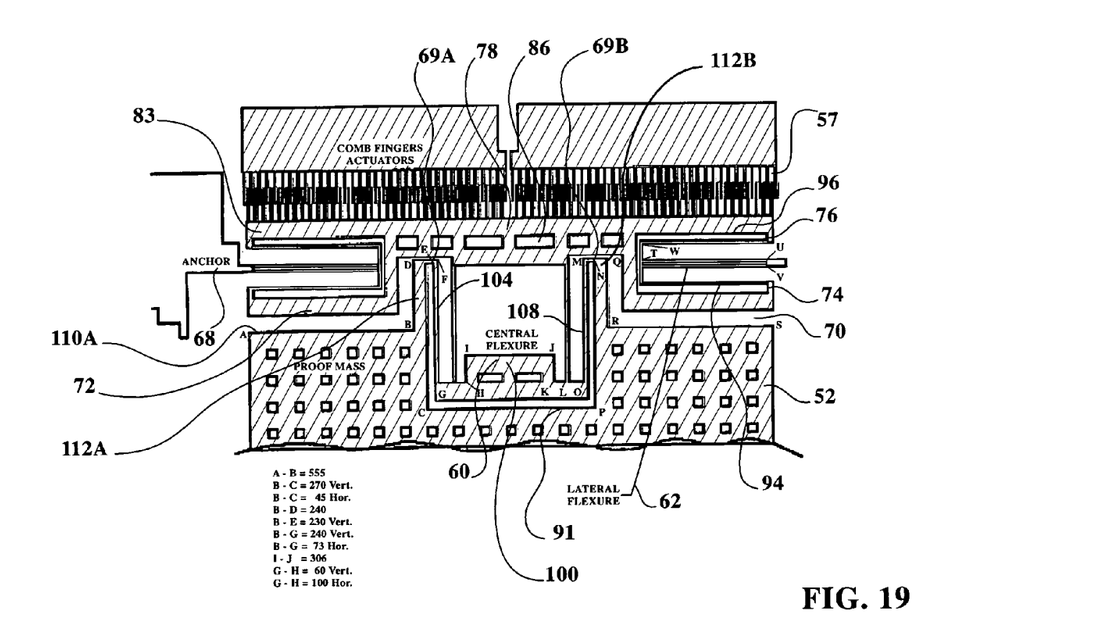
Figure 20:
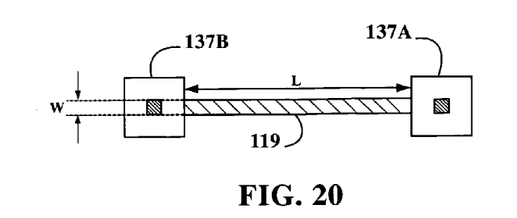
FIG. 20 is a side-view of a straight resistor element of the heat sensor according to the present invention.

With reference to FIGS. 18 and 19, the central flexure 60 is provided with flexure strips 102 and 106 that connect flexure support 78 to strip connector 100. Central flexure 60 further includes flexure strips 104 and 108 that extend from strip connector 100 toward the flexure support 78, but do not contact flexure support 78. Instead, strips 104 and 108 connect to lateral isthmus 69A and lateral isthmus 69B, respectively. Lateral isthmus 69A connects to promontory region 112A of proof mass 52 and lateral isthmus 69B connects to promontory region 112B of proof mass 52. Strip connector 100 is positioned proximate to but does not touch the central interior border 91 of the proof mass 52. Strips 102 and 106 extend from strip connector 100 to the central part 80 of flexure support 78.

The flexure support (rotor) 78 provides support for a central flexure and two lateral flexures on each side of the central flexure 60. The flexure support 78 extends laterally on both sides of its central region 80 to form lateral support regions 83. From the lateral support region 83 an isthmus strip 76 connects to strip 96.

Strips 88 and 92 are positioned in the middle region of the lateral flexure and are integrally attached to an anchor 68. A narrow channel 90 extending to the base substrate surface separates strips 88 and 92. Strip 94 is connected to strips 96, 88 and 92 by an orthogonal connector 99 that is proximate to but does not touch a connecting region 82 which connects the central part 80 of flexure support 78 with a support arm 72. An isthmus 74 connects the support arm 72 with strip 94. Strips 96, 88, 92 and 94 are all parallel to one another.

Still with reference to FIGS. 18 and 19, the prototype gyroscope of the present invention had a proof mass that measured 1770 μm across. The side border regions 110A, 110B measured 555 μm in length. The promontory regions 112A, 112B measured some 240 μm in length and 45 μm in width. A distance of some 52 μm separated the strip 96 from strip 88 and the same 52 μm separated strip 92 from strip 94. Strips 96, 88, 92 and 94 measured about 8 μm in width and had a length of approximately 422 μm. Orthogonal connector 99 had a width of 8 μm as well. Strips 104, 102, 106 and 108 had a length of approximately 420 μm and measured 8 μm across. Strip 104 was separated from promontory 112A by a distance of 28 μm. A distance of some 30 μm separated the central interior border 91 of proof mass 52 from strip connector 100.

The strips 96, 88, 92, 94 of lateral flexures 62 and the strips 104, 102, 106 and 108 of the central flexures 60 may be viewed as forming folds with gaps lying between the respective strips. Respective gaps separate the strips 96, 88, 92, 94 from the support arm 72, connecting region 82 and lateral strip 83 of flexure support 78. A gap separates the connecting region 82 of flexure support 78 from the promontory region 112 of the proof mass. A gap separates the side border 91 of the proof mass from the support arm 72 of the flexure support 78.

With reference to FIG. 10 and FIGS. 20-22, a temperature sensor 118 is provided on the same base substrate surface as the gyroscope 50. In this manner the temperature detected by the temperature sensor will more accurately convey the actual temperature experienced by the gyroscope. Further, the temperature sensor can be formed during the same manufacturing process as the gyroscope. The temperature sensor has an array of resistors of various lengths and types.

Figure 10:
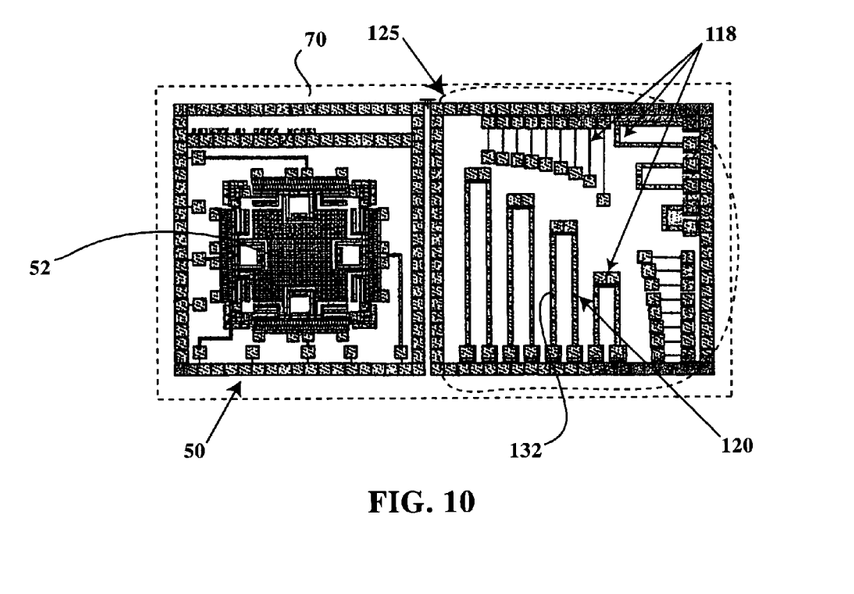
FIG. 10 is a top view of the single-substrate gyroscope and temperature sensor according to the present invention.

The integrated temperature sensor in FIG. 10 includes folded silicon resistor bridges. The resistors exhibit a temperature dependent resistance. These are measured by applying a DC current level and monitoring voltage across the bridge. An array of folded bridges of various lengths and straight sensors of various lengths are provided to more accurately detect temperature in varying temperature ranges.

Figure 21:
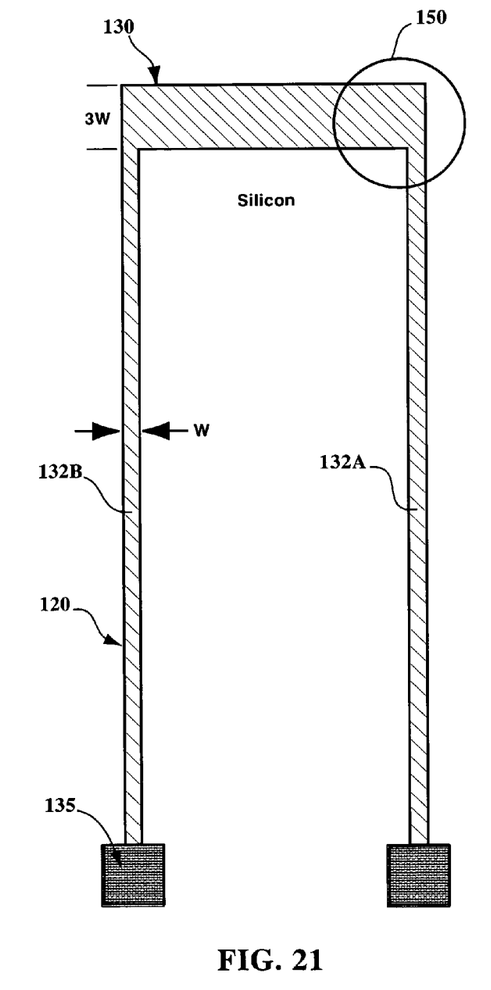
FIG. 21 is a top-view of a folded resistor element of the heat sensor according to the present invention.

A folded resistor 120 of an array of resistors 125 is provided with beam regions 132A and 132B that connect at one end to an electrical contact 135. The other end 130 of the beams 132A and 132B is a folded region that is supported by an insulation layer of oxide 160 that is left behind after the etch and release step of the manufacturing process.

Figure 22:
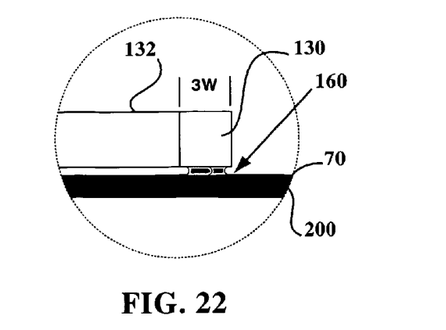
FIG. 22 is a side-view of a portion of the folded support area of the resistor element of FIG. 21.
Figure 23:
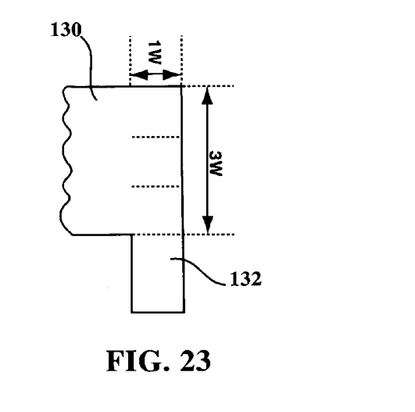
FIG. 23 is a schematic illustration of the folded support region of FIG. 21.

The side view of the region 150 of FIG. 21 is demonstrated in FIG. 22. FIG. 22 and FIG. 23 demonstrate that the folded end region is three times thicker than the support beams. This construction gives proper support and prevents the beams 132A, 132B from touching and shorting out on the underlying base substrate surface 70.

For the integrated temperature sensors, the sensitivity of the resistor bridges to temperature is an important factor. The resistivity of the starting material (ρ) was defined as 0.1 ohm-cm and the thickness (t) was defined to be 100 μm. Sheet resistance is defined as:

$$R_s = \frac{\rho}{t}$$

and given in units of ohms/square. The resistance of a resistor is then defined as $$R = R_s\left(\frac{L}{W}\right)$$

where L is defined as the length and W is defined as the width of the trace. Some of the integrated resistors used in the current embodiment are straight like the one depicted, but others are folded and serpentine versions.

To calculate the resistance change due to temperature the following equation is used $$R=R_0(1+\alpha(T-T_0))$$

where $\alpha$ is defined to be the temperature coefficient of resistance (TCR), T is the temperature, $T_0$ and $R_0$ are the temperature and resistance references respectively.

$T_0$ is defined to be 300K. The TCR for silicon of this doping level has been experimentally measured as 2.5E-03 $K^{-1}$. In calculating the total resistance two factors must be considered (1) the resistance due to the bridge and (2) the resistance due to any corners in the layout.

For all of the folded resistor bridges, a turn is required in order to line up the bond pads with the periphery of the chip. This turn must be accounted for when calculating resistance.

To prevent accidental shorting due to long unsupported beams touching the handle of the wafer, all ends of the beams are anchored. This requires a corner configuration as shown in FIG. 23.

The integrated temperature sensors (FIG. 10) provide a real-time and accurate measurement of temperature right on the MEMS chip. This is important in maintaining gyroscope performance when exposed to extreme temperature conditions.

Figure 24:
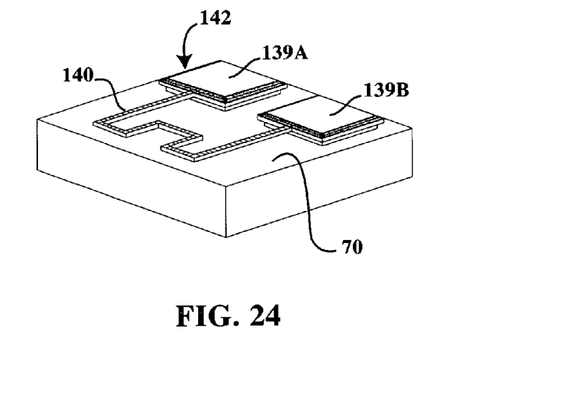
FIG. 24 is a perspective illustration of a serpentine resistor element being supported on a silicon substrate according to another embodiment of the present invention.

The array of integrated temperature sensors provide accurate temperature data and can be manufactured on the same chip and at the same time as the gyroscope components without extra processing steps or external integration thereby greatly reducing manufacturing costs. In FIG. 24 a serpentine resistor 142 having a serpentine beam 140 is supported by contacts 139A, 139B.

Figure 25:
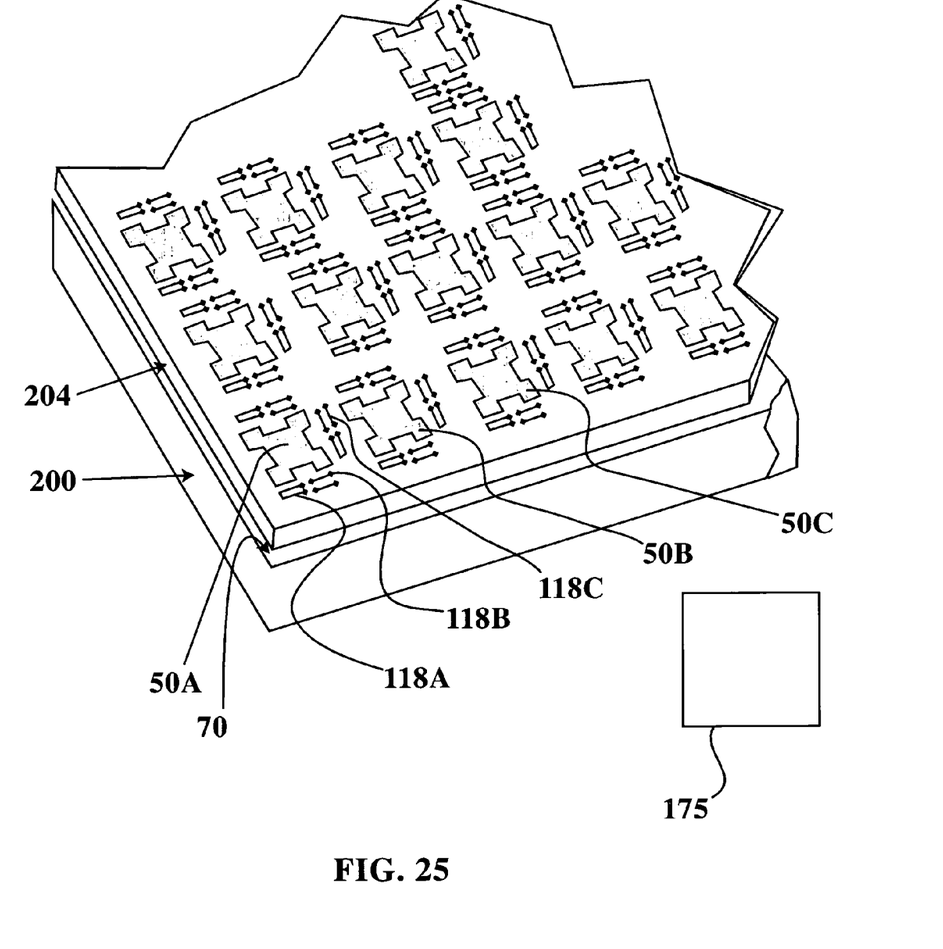
FIG. 25 is a perspective illustration of a plurality of gyroscopes and a corresponding plurality of sensor elements all arranged on a single substrate.

The SOI-MEMS technology utilized by the present invention allows hundreds of complementing gyroscopes 50A, 50B, 50C, etc., and temperature sensors 118A, 118B, 118C, etc. to be manufactured on the same chip with readout of information being sent to control electronics or CPU 175.

From the above description those skilled in the art will recognize that various modifications and embodiments may be made without departing from the spirit of the invention. Accordingly, the scope of the invention is to be limited only by the claims appended hereto.

What is claimed is:

1. A device for determining an angular rotation and/or angular rotation rate of a body, said device comprising:
    a substrate;
    a gyroscope formed above said substrate; and
    a temperature sensor formed above said substrate for sensing the temperature of said gyroscope; and
    wherein said temperature sensor has a plurality of resistors that are formed above a substrate surface of said substrate.

2. A device according to claim 1, wherein said substrate is a silicon substrate.

3. A device according to claim 1, wherein said gyroscope is formed from silicon in a MEMS manufacturing process.

4. A device according to claim 1, wherein said temperature sensor is formed from silicon in a MEMS fabrication process.

5. A device according to claim 2, wherein said gyroscope has a proof mass attached to said substrate by a plurality of flexures.

6. A device according to claim 1, wherein each of said plurality of resistors has a beam portion that lies above the base surface of said substrate such that a gap exists between the recess of said substrate and said beam portion of each of said plurality of resistors.

7. A device according to claim 6, wherein one end of said beam portion is supported by and connected to a respective electrically conductive anchor and the other end of said beam portion is supported by a respective insulated support.

8. A device according to claim 1, wherein the plurality of resistors vary in resistance.

9. A device according to claim 7, wherein said other end of said beam portion is a folded region having three times the thickness of said beam portion.

10. A device according to claim 1, wherein said substrate is a silicon substrate, said gyroscope is formed of silicon and said temperature sensor is made of a plurality of resistors formed of silicon, said device being fabricated by a SOI-MEMS process.

11. A device according to claim 10, wherein, said plurality of resistors provide an accurate measurement of temperature over a wide temperature range.

12. A device according to claim 10, wherein said gyroscope and said temperature sensor are electrically connected, said gyroscope and said temperature sensor being electrically connected to a CPU.

13. A device for measuring motion of an object, comprising:
    a substrate;
    means for detecting motion of the object, said means for detecting motion being formed above said substrate;
    a temperature sensor electrically connected to said means for detecting motion, said temperature sensor being formed above said substrate such that a gap exists between said temperature sensor and said substrate; and
    said temperature sensor comprises at least one resistor having two beams that are electrically connected to an anchor at one end and which form a folded region at another end, said folded region being supported by a non-conductive support.

14. A device according to claim 13, wherein:
    said means for detecting motion comprises a proof mass, said proof mass connecting to said substrate by a plurality of flexures.

15. A device according to claim 14, wherein:
    said temperature sensor comprises a plurality of resistors with a beam portion of each of said resistors extending above a base substrate surface of said substrate, said beam portion connecting to an electrically conductive anchor that connects to said substrate.

16. A device according to claim 14, wherein:
    said folded region is three times thicker than the thickness of each said two beams.

17. A device according to claim 15, wherein:
    said substrate, said means for detecting motion, and said temperature sensor are comprised of silicon.

* * * * *